United States Patent [19]
Neack

[11] Patent Number: 5,454,578
[45] Date of Patent: Oct. 3, 1995

[54] BICYCLE TOWING APPARATUS

[76] Inventor: Lawrence E. Neack, 10204 Amberwood Ct., Cincinnati, Ohio 45241

[21] Appl. No.: 324,595

[22] Filed: Oct. 17, 1994

[51] Int. Cl.$^6$ ................................................ B62K 27/00
[52] U.S. Cl. ............................................ 280/204; 280/292
[58] Field of Search ............................ 280/204, 202, 280/292, 288.4, 293, 400, 411.1

[56] References Cited

U.S. PATENT DOCUMENTS

| | | | |
|---|---|---|---|
| 656,998 | 8/1900 | McDonald et al. | 280/292 |
| 3,787,065 | 1/1974 | Grimm | 280/204 |
| 3,934,666 | 1/1976 | Ellington | 280/204 |
| 4,114,919 | 9/1978 | Stowe | 280/292 |
| 4,261,592 | 4/1981 | Busseuil | 280/292 |
| 4,725,067 | 2/1988 | Lundy | 280/204 |
| 5,039,120 | 8/1991 | Stowe | 280/204 |
| 5,067,738 | 11/1991 | O'Connor | 280/204 |

FOREIGN PATENT DOCUMENTS

| | | | |
|---|---|---|---|
| 3214448 | 10/1983 | Germany | 280/204 |
| 3739515 | 6/1989 | Germany | 280/204 |
| 89/03785 | 5/1989 | WIPO | 280/204 |

*Primary Examiner*—Kevin T. Hurley
*Attorney, Agent, or Firm*—Glenn D. Bellamy

[57] ABSTRACT

A bicycle towing apparatus (10) for towing a second bicycle (82) behind a first bicycle (90) comprising a frame structure (12,14) including a front connector (16) for securing the bicycle towing apparatus to the first bicycle, and a rear connector (68) for securing the bicycle towing apparatus to the front fork (80) of the second bicycle, a pair of outrigger wheels (20) rotatably attached to a lower portion of the frame structure (12,14) and spaced apart to provide lateral stability to the bicycle towing apparatus. The frame structure also includes a horizontal cross bar (22), a pair of parallel towing bars (30,32), and a pair of angled upright braces (40,42).

10 Claims, 5 Drawing Sheets

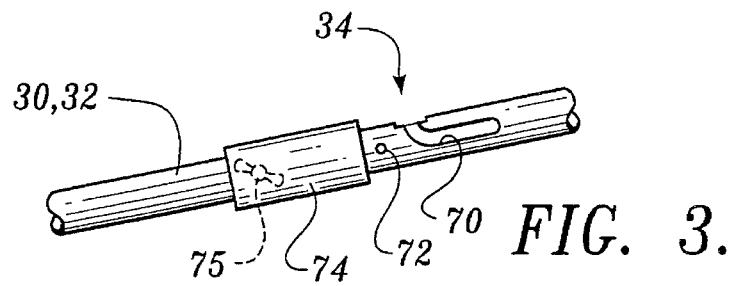
FIG. 3.
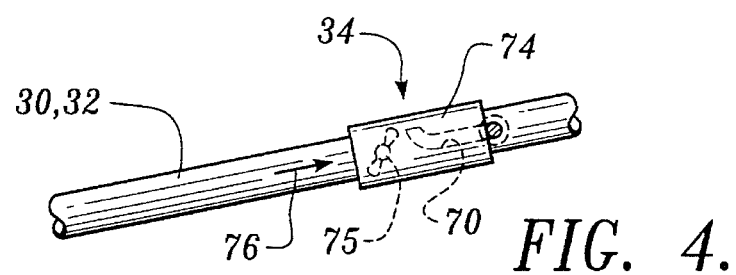
FIG. 4.
FIG. 5.
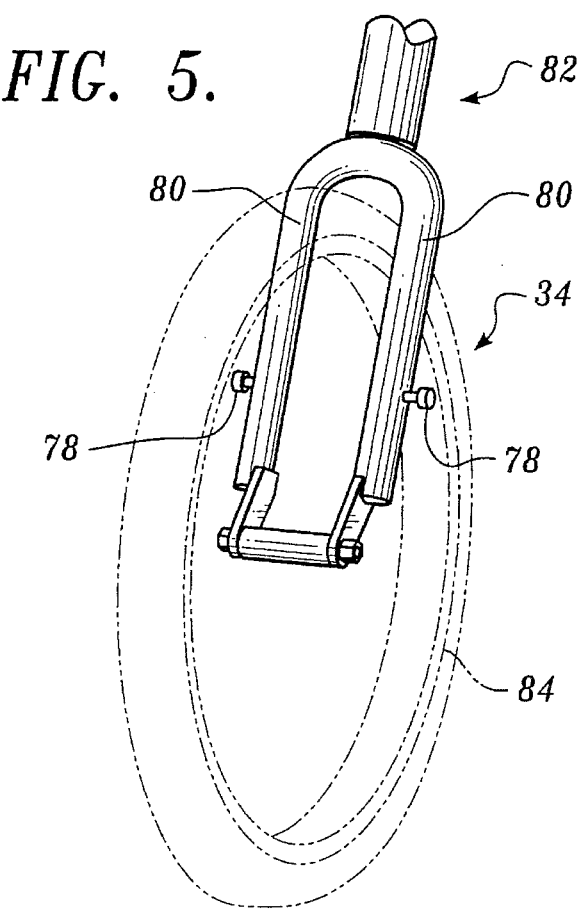

5,454,578

BICYCLE TOWING APPARATUS

BACKGROUND OF THE INVENTION

More and more today, families enjoy bicycling together. For families with young children, it is common for a child to ride in a jump seat attached to their parent's bicycle. However, at a certain age, children no longer want to ride in the jump seat on their parent's bicycle, but wish to ride their own bicycle, with or without training wheels. The stamina of many adults who regularly ride bicycles generally will outlast the stamina of their young children. Consequently, family bicycle rides need to be kept short in order to avoid problems associated with an exhausted child.

With the growing trend today of establishing designated bicycle trails, sometimes from converted railroad beds, the opportunity for longer bicycle rides presents itself. Accordingly, there is a need for a solution to the problem of the limited physical skills of young children when it comes to family bicycle rides. The present invention is directed to just such a solution.

DISCLOSURE OF THE INVENTION

Briefly described, the present invention comprises a bicycle towing apparatus for towing a second bicycle behind a first bicycle, such as for a parent to use to tow their child's bicycle. The bicycle towing apparatus includes a frame structure that has a front connector for securing the bicycle towing apparatus to the first bicycle, such as the parent's bicycle, and a rear connector for securing the bicycle towing apparatus to the front fork of the second bicycle, the child's bicycle. The bicycle towing apparatus also includes a pair of outrigger wheels rotatably attached to a lower portion of its frame structure. The outrigger wheels are spaced apart to provide lateral stability to the bicycle towing apparatus and to help keep the child on his bicycle as it is being towed. The bicycle towing apparatus attaches at front to the first bicycle and at the rear to the front fork of the second bicycle. A parent can tow the second bicycle behind the first bicycle, with or without a second person riding on the second bicycle.

Preferably, the frame structure of the bicycle towing apparatus includes a forward arched section having sufficient arch to clear the rear wheel of the first bicycle. This prevents the bicycle towing apparatus from restricting the turning radius of the first bicycle.

The pair of outrigger wheels are spaced apart a sufficient distance to provide space for the front wheel of the second bicycle. In this manner, the bicycle towing apparatus can be kept compact, while at the same time providing sufficient lateral support to the second bicycle.

The frame structure of the bicycle towing apparatus includes a pair of towing bars each pivotally attached, at one of their ends, to the frame structure, and spaced apart at their opposite distal ends to form a receiving fork for the second bicycle. The rear connector is attached to the distal ends of the towing bars. So designed, the height of the rear connector can be adjusted to accommodate different sized second bicycles.

The frame structure of the bicycle towing apparatus includes a pair of angled uprights, each extending from adjacent an outrigger wheel to a distal end of a towing bar. The angled uprights are adjustable in length and are pivotally secured at their ends to the frame structure adjacent the outrigger wheels and the distal ends of the towing bars. The angled uprights transfer lateral forces to and from the outrigger wheels and the towing bars, keeping the second bicycle upright.

Preferably the frame structure of the bicycle towing apparatus includes a lateral cross member positioned above the outrigger wheels. The towing bars are pivotally attached to this lateral cross member.

The rear connector includes a first component, such as a rearwardly angled slot and cover sleeve, that is part of each towing bar, and a second component, such as a laterally extending connector bolt, that is attachable to the front fork of the second bicycle and is designed to remain with the second bicycle. Such a rear connector arrangement allows for quick connect and disconnect of the bicycle towing apparatus and the second bicycle.

Preferably, the front connector is adapted to connect to the seat stem of the first bicycle. However, in an alternative embodiment of the present invention, the frame structure includes a C-shaped connector bar for attachment to the rear frame structure of the first bicycle. In this embodiment, the bicycle towing apparatus includes a front wheel rotatably mounted to the frame structure, so that a total of three wheels are provided with the bicycle towing apparatus.

With the present invention, parents can ride their bicycles with the bicycle towing apparatus attached, and the parent's child can ride his bicycle separate from the bicycle towing apparatus. Should the child become tired, the parent can quickly attach the bicycle towing apparatus to the child's bicycle and tow their child on his bicycle back home or until the child is rested enough to again ride alone.

These and other features, advantages, and objects of the present invention will become apparent from the best mode description, the drawings, and the claims, which are all incorporated by reference as a part of the disclosure of the invention.

BRIEF DESCRIPTION OF THE DRAWINGS

In the drawings, like reference numerals refer to like parts throughout the several views, wherein:

FIG. 3, 4 are enlarged side detail views of the rear connector components on the towing bars of the bicycle towing apparatus of FIG. 1;

FIG. 5 is a pictorial view of the rear connector component on the front fork of a towed bicycle, shown with the front wheel in dashed lines;

BEST MODE FOR CARRYING OUT THE INVENTION

Figure 1:
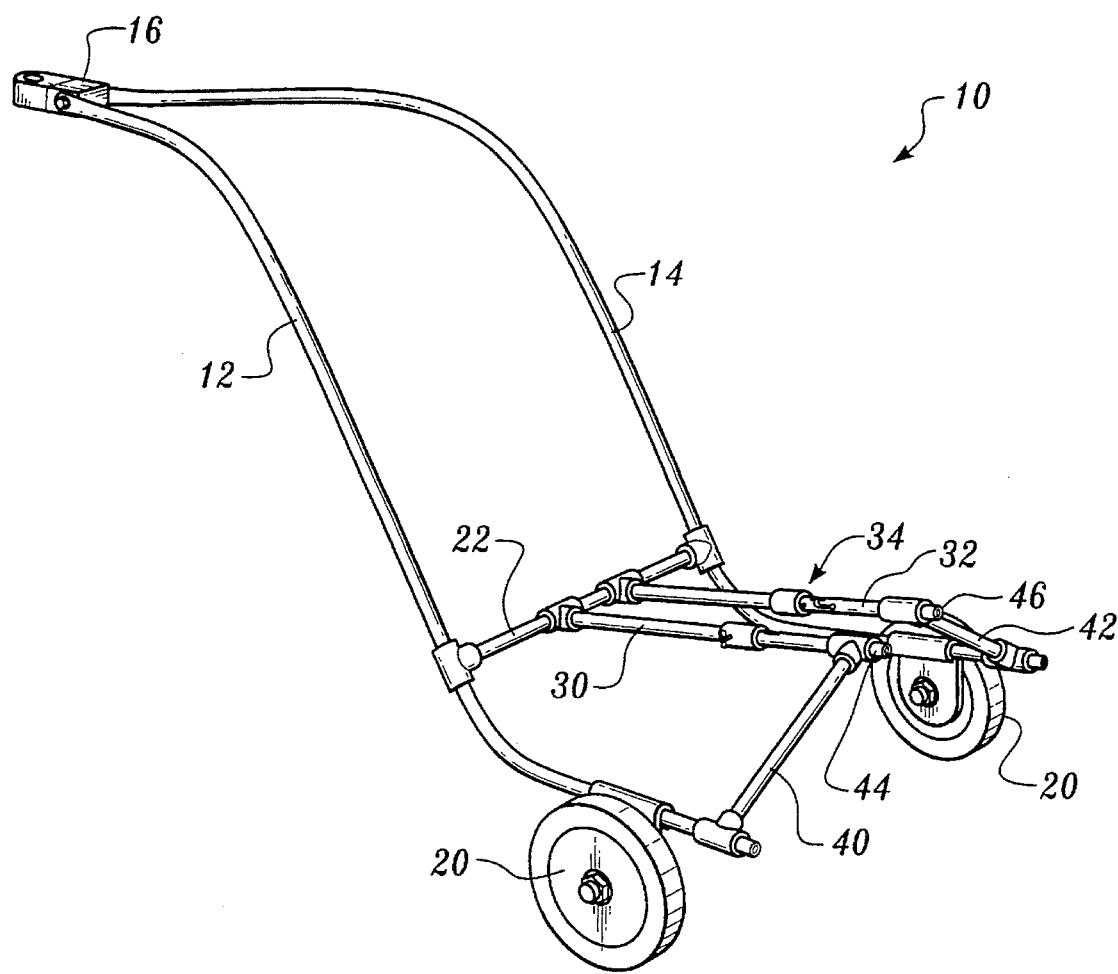
FIG. 1 is a pictorial view of the bicycle towing apparatus of the present invention, in a preferred embodiment thereof.

Referring to FIG. 1, there is shown a bicycle towing apparatus 10 for towing a second bicycle behind a first bicycle. Bicycle towing apparatus 10 includes a left arcuate frame piece 12 and a right arcuate frame piece 14. Left and right frame pieces 12,14 are joined at their forward ends to a front connector 16. Front connector 16 detachably connects to a seat stem of the first bicycle, which is to do the towing. Front connector 16 could be any of several well-known type connectors currently used for bicycle trailers, but should include a pivotal connection to the seat stem so that the bicycle towing apparatus does not restrict the turning radius of the towing bicycle.

An outrigger wheel 20 is rotatably attached to a lower section of each left and right frame piece 12,14. Outrigger wheels 20 are spaced apart a distance sufficient enough to provide room for the second, towed bicycle to ride between the outrigger wheels. In this manner, it is not necessary to have an axle extending between outrigger wheels 20, which could interfere with a front wheel of the second bicycle.

A horizontal, lateral cross bar 22 is fixedly secured between left and right frame pieces 12,14. A pair of rearwardly extending parallel towing bars 30,32 are pivotally attached to horizontal cross bar 22. Towing bars 30,32 are spaced apart a distance sufficient to allow the front wheel and fork assembly of a second bicycle to be held therebetween. The rear connector components 34 are mounted on towing bars 30,32, and are discussed with reference to FIGS. 3–5. Towing bars 30,32 pivot at cross bar 22 so that they can accommodate different sized bicycles. Alternatively, however, towing bars 30,32 can be fixedly attached to horizontal cross bar 22, and cross bar 22 can be rotatably secured between left and right frame pieces 12,14.

A pair of angled upright braces 40,42 are provided to further brace the structure. Angled upright braces 40,42 each extend from the lower ends of left and right frame pieces 12,14 to the distal ends 44,46 of towing bars 30,32. Preferably, angled upright braces 40,42 are adjustable in length so that they can move with towing bars 30,32, allowing the bicycle towing apparatus to accommodate different sized bicycles. Any well-known design for making uprights 40,42 adjustable is suitable for the present invention. For example, uprights 40,42 can telescope, overlap, or interlock in a manner allowing their length to vary and allowing them to be locked once adjusted. In operation, uprights 40,42 transfer lateral forces between outrigger wheels 20 and towing bars 30,32, keeping the second bicycle upright.

Collectively, left and right frame pieces 12,14, horizontal cross bar 22, towing bars 30,32, and angled upright braces 40,42 comprise a frame structure for the bicycle towing apparatus.

Figure 2:
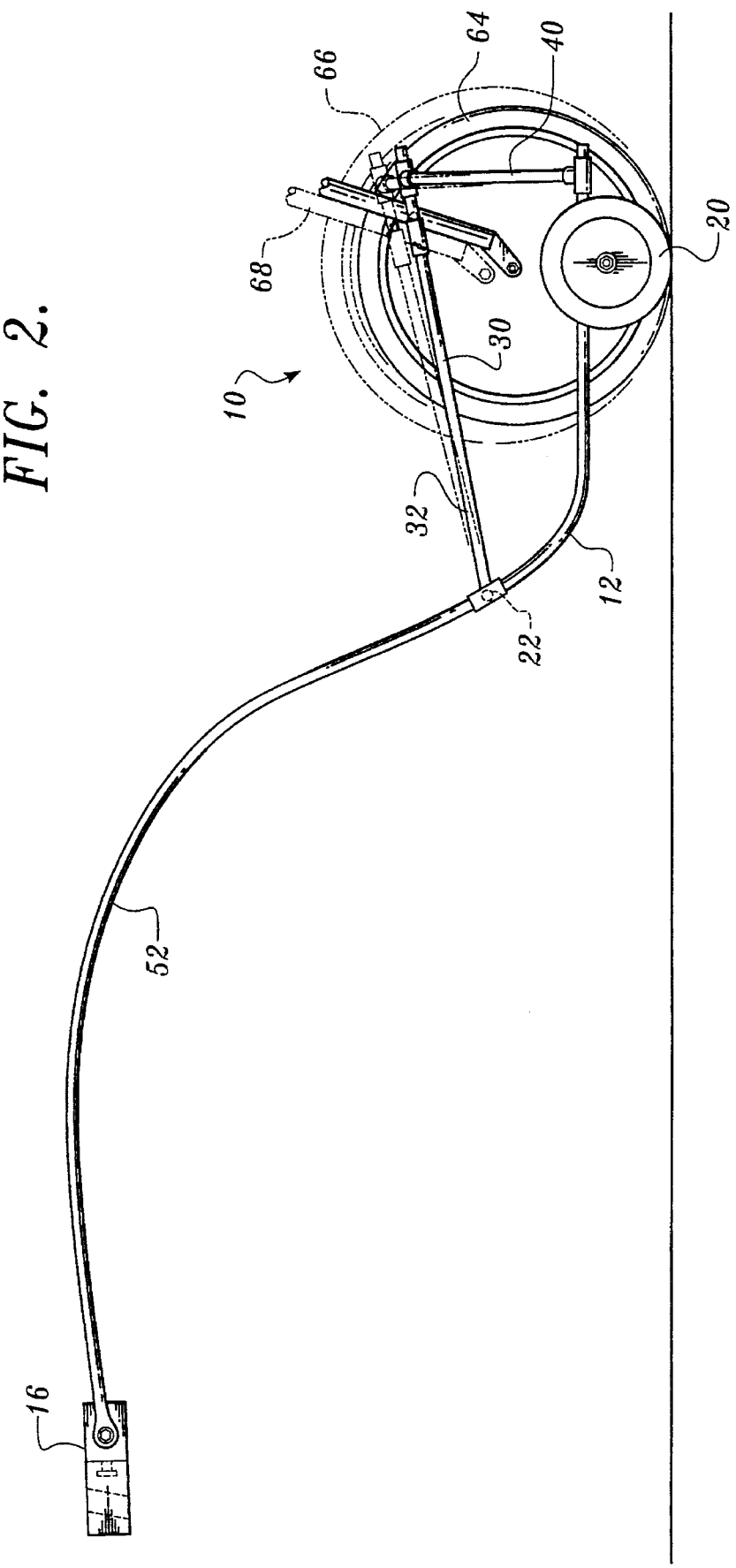
FIG. 2 is a side elevation showing two different sized towed bicycles, one of which is shown in dashed lines, hooked to the bicycle towing apparatus of FIG. 1.

Referring to FIG. 2, it can be seen that horizontal cross bar 22 is backset far enough along frame pieces 12,14 so that it does not contact the rear tire of the first bicycle. The curvature of left and right frame pieces 12,14 can clearly be seen in this figure. Preferably, front connector 16 includes a universal pivot so that the bicycle towing apparatus can be used with different sized first bicycles. Left and right frame pieces 12,14 include a forward arched section 52 that is designed to clear the rear wheel and tire of the first bicycle when the first bicycle turns a corner and the bicycle towing apparatus pivots with respect to the first bicycle.

Shown at the rear of bicycle towing apparatus 10 are two different sized towed bicycles 64,66, bicycle 66 shown in dashed lines. Because bicycle 66 is larger than bicycle 64, the point of attachment for towing bars 30,32 to the front forks 68 of bicycle 66 is higher than the point of attachment to bicycle 64. Accordingly, towing bars 30,32 pivot upwardly, as do angled upright braces 40,42, to accommodate the larger sized bicycle 66.

Referring to FIGS. 3, 4, a rear section of one of towing bars 30,32 is shown. Towing bars 30,32 are identical in design. The rear connector 34 is shown to include a connector bolt slot 70 formed in towing bar 30,32, a pin hole 72, and a locking sleeve 74. Locking sleeve 74 slides between a forward, unlocking position shown in FIG. 3 to a rearward, locking position, as indicated by arrow 76 in FIG. 4. In its locking position, locking sleeve 74 closes off slot 70. A suitable pin 75 is used to secure locking sleeve 74 in its locked position via pin hole 72. Slots 70 can be either forward or behind the connection between the angled upright braces and the towing bars 30,32. Currently, I envision the slots being forward of the connection.

Referring to FIG. 5, rear connector 34 also includes a pair of connector bolts 78, one each secured to a fork 80 of a second bicycle 82, of which only the front wheel assembly is shown. The front wheel and tire 84 of second bicycle 82 is shown in dashed lines for clarity of illustration of both connector bolts 78. It is intended that connector bolts 78 be fixedly secured to forks 80 and remain attached thereto, even when second bicycle 82 is not being towed.

Connector bolts 78 slide into connector slots 70 when front tire and wheel 84 of second bicycle 82 is positioned between towing bars 30,32. Connector slots 70 allow connector bolts 78 to slide backwards into the ends of the slots where locking sleeves 74 are slid backwards to "lock" the bolts in the slots. In this manner, the bicycle towing apparatus firmly holds the front wheel section of the second bicycle, eliminating the need for balancing the second bicycle. Alternatively, the rear connector could attach to the yoke or handle bars of the second bicycle. Also, training wheels could be placed on the second bicycle to assist further in balancing the bicycle.

Figure 6:
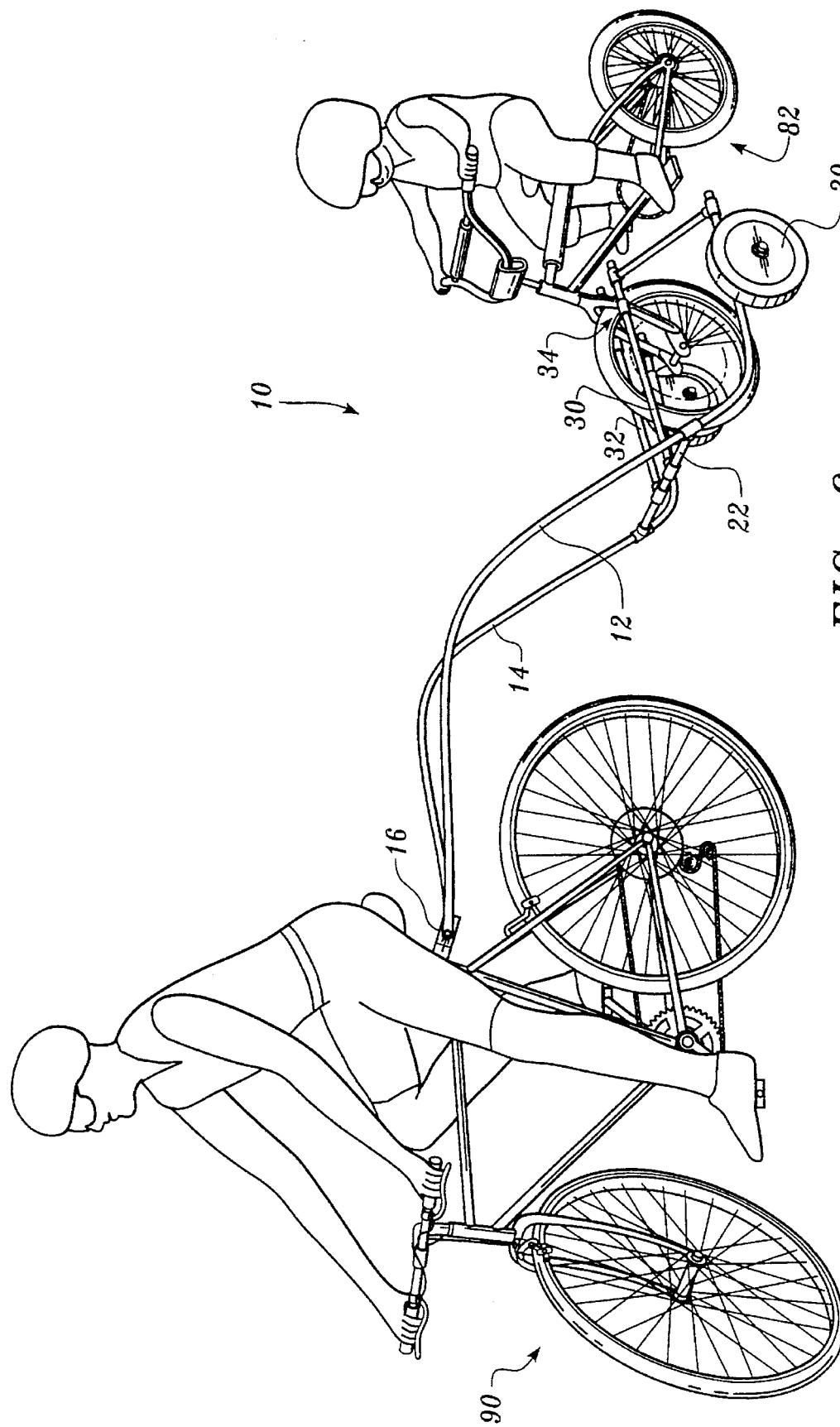
FIG. 6 is a full view of the bicycle towing apparatus of FIG. 1, shown attached to a first bicycle and towing a second bicycle.

Referring to FIG. 6, shown are a parent riding a first bicycle 90 and the parent's child riding a second bicycle 82. The bicycle towing apparatus 10 is attached at front connector 16 to first bicycle 90, and at its rear towing bars 30,32 to second bicycle 82. In this manner, a parent or other adult can tow both their child and the child's bicycle should the child become tired or otherwise be unable to peddle their bicycle. So designed, families can now take longer bicycle rides.

Figure 7:
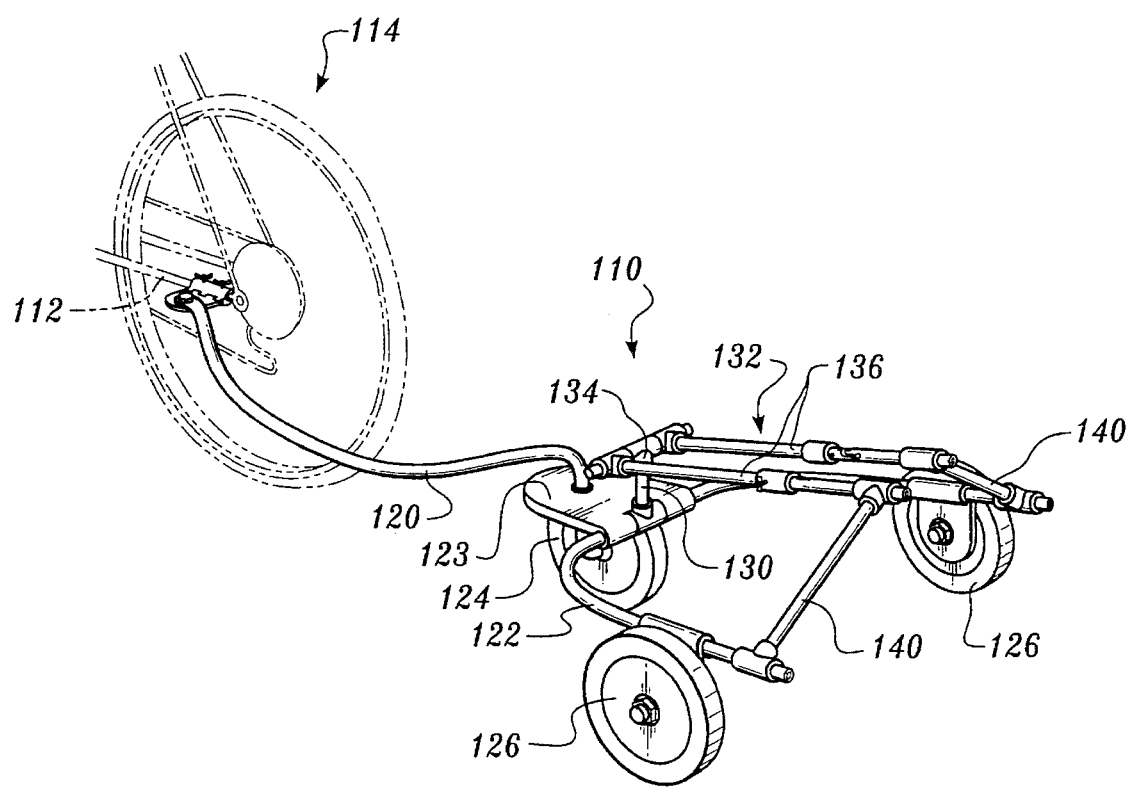
FIG. 7 is an alternative embodiment of the bicycle towing apparatus of FIG. 1.

FIG. 7 shows an alternative embodiment of the bicycle towing apparatus of the present invention. The apparatus is designated 110, and is shown attached to a lower frame section 112 of a first bicycle 114, the rear portion of which is shown in dashed lines. The second bicycle is not shown, but would mount to bicycle towing apparatus 110 in a manner similar to that described for the first embodiment.

Bicycle towing apparatus 110 includes a C-shaped connector 120, the front of which attaches to lower frame section 112. The rear end of connector 120 attaches to the main frame structure 122 of the apparatus by means of plate 123. A pivotal connection should be provided where connector 120 attaches to frame structure 122. This allows the apparatus to be used with different sized first bicycles, and also allows connector 120 to fold upwardly for storage.

Frame structure 122 carries a forward wheel assembly 124 and a pair of outrigger wheels 126. An upright post 130 supports a pivotable U-shaped towing bar 132, which pivots at 134. Towing bar 132 includes spaced apart bars 136, which receive the front wheel assembly of a second bicycle. The front fork assembly of the second bicycle detachable mounts between bars 136, in a manner similar to the detachable connection of the first embodiment.

As with the first embodiment, bicycle towing apparatus 110 includes a pair of angled uprights 140. Each upright 140 extends from the rear end of frame structure 122 up to towing bar 132. Preferably, angled uprights 140 are adjustable in length so as to accommodate different sized second bicycles.

The second embodiment can be made smaller in size than the first embodiment, and thus, is easier to tow and store. This is due primarily to the design of the connection of the bicycle towing apparatus to the first bicycle.

It is to be understood that many variations in size, shape, and construction can be made to the illustrated and above-described embodiment without departing from the spirit and scope of the present invention. Some of the features of the preferred embodiment may be utilized without other features. Therefore, it is to be understood that the presently described and illustrated embodiment is non-limitive and is for illustration only. Instead, my patent is to be limited for this invention only by the following claim or claims interpreted according to accepted doctrines of claim interpretation, including the doctrine of equivalence and reversal of parts.

What is claimed is:

1. A bicycle towing apparatus for towing a second bicycle behind a first bicycle, comprising:

a frame structure including a front connector for securing the bicycle towing apparatus to the first bicycle, and a rear connector for securing the bicycle towing apparatus to the front portion of the second bicycle, a pair of outrigger wheels rotatably attached to a lower portion of the frame structure and spaced apart to provide lateral stability to the bicycle towing apparatus, whereby the bicycle towing apparatus can attach to the first bicycle and the front portion of the second bicycle, and a person can tow the second bicycle behind the first bicycle, with a second person riding on the second bicycle.

2. The bicycle towing apparatus of claim 1, wherein the frame structure includes a forward arched section having sufficient arch to clear the rear wheel of the first bicycle.

3. The bicycle towing apparatus of claim 1, wherein the pair of outrigger wheels are spaced apart a sufficient distance to provide space for the front wheel of the second bicycle.

4. The bicycle towing apparatus of claim 1, wherein the frame structure includes a pair of towing bars each pivotally attached to the frame structure at one of their ends, and spaced apart at their opposite distal ends, the rear connector being attached to the distal ends of the towing bars, whereby the height of the rear connector is adjustable to accommodate different sized second bicycles.

5. The bicycle towing apparatus of claim 4, wherein the frame structure includes a pair of angled uprights, each extending from adjacent an outrigger wheel to a distal end of an arm.

6. The bicycle towing apparatus of claim 5, wherein the angled uprights are adjustable in length and are pivotally secured at their ends to the frame structure.

7. The bicycle towing apparatus of claim 4, wherein the frame structure includes a lateral cross member to which the towing bars are pivotally attached.

8. The bicycle towing apparatus of claim 4, wherein the rear connector includes a first component that is part of the towing bars, and a second component that is attachable to the front fork of the second bicycle and is designed to remain with the second bicycle.

9. The bicycle towing apparatus of claim 1, wherein the front connector is adapted to connect to the seat stem of the first bicycle.

10. The bicycle towing apparatus of claim 1, wherein the frame structure includes a C-shaped connector bar for attachment to the rear frame structure of the first bicycle, and further comprising a front wheel rotatably mounted to the frame structure.

* * * * *